United States Patent [19]

Valls, Jr.

[11] Patent Number: 5,099,888

[45] Date of Patent: Mar. 31, 1992

[54] IMPACT PROTECTED, SEALED, DOUBLE-WALLED PIPE BODY

[75] Inventor: Jose E. Valls, Jr., Ponce, P.R.

[73] Assignee: Vassallo Research and Development Corporation, Coto Laurel, P.R.

[21] Appl. No.: 532,322

[22] Filed: Jun. 4, 1990

[51] Int. Cl.⁵ .................... B29C 11/00; F16L 9/18
[52] U.S. Cl. ............................... 138/109; 138/115
[58] Field of Search ............... 138/109, 111, 114, 115, 138/148

[56] References Cited

U.S. PATENT DOCUMENTS

| | | |
|---|---|---|
| 627,293 | 6/1899 | Brighton . |
| 1,218,895 | 3/1917 | Porter . |
| 1,266,831 | 5/1918 | Layne . |
| 1,677,714 | 7/1928 | Frease . |
| 1,746,132 | 8/1925 | Stokes ................... 138/109 |
| 2,126,075 | 8/1938 | Wright ..................... 255/28 |
| 3,087,513 | 4/1963 | O'Rourke ............... 138/109 |
| 3,120,570 | 2/1964 | Kennedy et al. ......... 264/45 |
| 3,167,204 | 1/1965 | Rouse, Jr. ................ 220/5 |
| 3,217,077 | 11/1965 | Cocke ..................... 264/256 |
| 3,379,221 | 4/1968 | Harry et al. ............. 138/148 |
| 3,464,450 | 9/1969 | Steffenini ................ 138/113 |
| 3,495,628 | 2/1970 | Boender .................. 138/114 |
| 3,665,967 | 5/1972 | Kachnik .................. 138/137 |
| 3,679,531 | 7/1972 | Wienand et al. ........ 161/48 |
| 3,725,522 | 3/1973 | Sheridan et al. ........ 264/138 |
| 3,747,632 | 7/1973 | Kok et al. ............... 137/375 |
| 3,757,827 | 9/1973 | Seiwert et al. .......... 138/109 |
| 3,781,041 | 12/1973 | Petzetakis ............... 285/111 |
| 3,783,067 | 1/1974 | Petzetakis ............... 156/163 |
| 3,823,216 | 7/1974 | Petzetakis ............... 264/89 |
| 3,843,302 | 10/1974 | Petzetakis ............... 425/388 |
| 3,895,830 | 7/1975 | Madlem .................. 285/27 |
| 3,917,500 | 11/1975 | Petzetakis et al. ...... 156/195 |
| 3,920,268 | 11/1975 | Stewing .................. 285/21 |
| 3,953,057 | 4/1976 | Petzetakis ............... 285/67 |
| 4,014,369 | 3/1977 | Kobres, Jr. ............. 138/112 |
| 4,033,808 | 7/1977 | Petzetakis ............... 156/425 |
| 4,034,994 | 7/1977 | Ohta et al. .............. 277/207 A |
| 4,085,185 | 4/1978 | Adair ...................... 264/248 |
| 4,193,426 | 3/1980 | Irmer ...................... 138/109 |
| 4,280,534 | 7/1981 | van Dongeren ......... 138/109 |
| 4,341,392 | 7/1982 | van Dongeren ......... 277/207 A |
| 4,343,480 | 8/1982 | Vassallo .................. 277/207 A |
| 4,344,461 | 8/1982 | Beune et al. ............ 138/109 |
| 4,362,187 | 12/1982 | Harris et al. ............ 138/109 |
| 4,390,383 | 6/1983 | van Dongeren ......... 138/109 |
| 4,428,591 | 1/1984 | Marissen et al. ........ 277/207 A |
| 4,432,395 | 2/1984 | Beune et al. ............ 138/109 |
| 4,474,726 | 10/1984 | Ohta et al. .............. 264/516 |
| 4,487,232 | 12/1984 | Kanao ..................... 138/122 |
| 4,759,389 | 7/1988 | Woo Suck ............... 138/154 |
| 4,824,502 | 4/1989 | Nagayoshi et al. ..... 156/244 |

FOREIGN PATENT DOCUMENTS

| | | |
|---|---|---|
| 2699908 | 2/1914 | Fed. Rep. of Germany . |
| 1107466 | 5/1961 | Fed. Rep. of Germany . |
| 1166668 | 6/1958 | France . |
| 54-103480 | 8/1979 | Japan . |
| 1185062 | 3/1970 | United Kingdom ............ 138/111 |

OTHER PUBLICATIONS

Modern Plastics, *The Pipe Business Gets a New Shake From Advanced Technology*, Feb. 1987.

*Primary Examiner*—Philip R. Coe
*Assistant Examiner*—Reginald L. Alexander
*Attorney, Agent, or Firm*—Roylance, Abrams, Berdo & Goodman

[57] ABSTRACT

Plastic pipe has a cylindrical body having longitudinally extending concentric walls spaced from the longitudinal axis of the pipe. The walls are connected by ribs extending generally radially between the walls and longitudinally of the pipe. The pipe is provided with a generally annular resilient axially extending sealing ring entrapped at the end of the pipe by removing an end portion of the ribs, heating and bending an end wall portion so as to entrap a portion of the sealing ring, while permitting a second portion of the ring to axially project beyond the end of the pipe to provide impact resistance to the pipe end. A further embodiment involves omission of the sealing ring and welding the small gap remaining after heating and bending an end wall portion to seal the pipe end.

16 Claims, 3 Drawing Sheets

IMPACT PROTECTED, SEALED, DOUBLE-WALLED PIPE BODY

BACKGROUND OF THE INVENTION

1. Field of the Invention

The present invention relates to end sealing and impact protection of double-walled pipe bodies and to the method for effecting sealing and providing impact resistance to pipe ends. More particularly, this invention relates to providing sealing and impact resistance to the ends of double-walled pipe having helical ribs between the inner and outer pipe walls.

2. Description of the Prior Art

It is known to employ plastic pipes and fittings in the design and construction of underground conduit systems for conveyance, water and drainage purposes. Individual sections of plastic pipe are joined together in end to end juxtaposition using the so-called "bell and spigot joint" where one end of a pipe or fitting is enlarged or "belled" to receive therein the unenlarged or "spigot" end of an adjacent length of pipe. The inside diameter of the belled section or hub is formed sufficiently large to receive the spigot end of the next adjacent section of pipe with sufficient annular clearance to provide for gaskets or other devices which are designed to prevent leakage at the pipe joints when the pipe sections are joined into a pipe line.

In the past, such plastic pipe has been extruded into various lengths and diameters depending upon their use. However, extrusion of plastic pipe, such as PVC (polyvinyl chloride) pipe has been limited by diameter and weight, thus preventing competition with conventional concrete pipe for large-diameter sewer applications. However, relatively recent advances in technology have enabled production of heavy-duty PVC pipe in bores up to 60 inches and larger, which is large enough to compete with concrete. For example, a system for producing large-diameter, hollow profile pipe is described in U.S. Pat. Nos. 3,917,500 and 4,033,808 involving spiral winding and infrared welding of an extruded hollow core rectangular profile. The resulting large bore pipe has compressive strength and stiffness of solid-wall pipe at a 50 to 60 percent savings in material.

While this hollow form of pipe has many advantages including production of heavy-duty PVC pipe in very large bores, and in virtually unlimited lengths, a problem encountered with this form of pipe is that the extruded hollow core profile produces channels having a spiral or helical configuration continuously throughout the pipe. If, for example, external liquid gets into this hollow, spiral channel of the pipe, it will eventually get to the inside of the pipe through the spigot end of the pipe, causing a leak if the spigot end is not sealed between its inner and outer walls. Alternatively, internal fluid leaking into the spiral channel could exit the belled end of the pipe, if that end is not sealed between its inner and outer walls. One attempt to solve such problem has been to file down the spigot end and then cover the holes in the ends and sharp edges with epoxy plastic putty. However, this approach is very time consuming and such epoxy resinous-type putty is very expensive. Additionally, in rough field handling, the putty pops out of the holes upon impact of the pipe.

U.S. Pat. Nos. 4,390,383, 4,280,534 and 4,341,392 disclose sealing end walls of hollow plastic pipes having lengthwise extending channels by heating and bending the ends to fuse sealing closed. U.S. Pat. No. 3,464,450 discloses the use of seal-type members in the form of a circular flange having projections with a helical outline whose pitch is the same as that of the ribs. However, none of these patents address impact resistance problems of the pipe ends.

SUMMARY OF THE INVENTION

Surprisingly, it has now been found that a double-walled pipe can be end sealed by a means which not only effectively closes the channel at the spigot and/or socket end of the pipe but, in addition, improves impact resistance to the pipe end by inserting an annular elastomeric plug in a slot formed at the pipe ends, whereby the plug projects axially beyond the pipe end to provide impact resistance.

The plastic pipe of the present invention comprises a cylindrical body having two longitudinally extending, concentric walls radially spaced from the longitudinal axis of the pipe in the form of an inner wall and an outer wall. The inner and outer walls of the pipe are connected by rib means extending generally radially between the wall and longitudinally with respect to the pipe, such rib means terminating adjacent to but spaced from one end of the pipe. The inner and outer walls of the pipe together with the rib means define at least one longitudinal slot opening on one end of the pipe.

In order to provide both a tight seal and impact resistance to the end of the pipe, a generally cylindrical or annular, elastomeric, axially extending sealing ring or plug is secured in the longitudinal slot and entrapped in the slot by end portions of the inner and outer walls such that a portion of the elastomeric sealing ring axially projects beyond the end of the pipe to provide impact resistance to that end of the pipe. The generally cylindrical, elastomeric, axially extending sealing ring or plug of the present invention can be provided in either or both of the spigot end and the belled socket end of the pipe as desired. Thus, if the sealing ring is provided in the spigot end of a pipe, it is entrapped by a converging outer wall at the end of the spigot to form a chamfer. On the other hand, if the sealing ring of the present invention is used on the belled end of the pipe, it is entrapped by a diverging inner wall at that end of the pipe. Alternatively, both the spigot and socket ends of the pipe may be provided with the sealing ring of the present invention.

The axially extending sealing ring of the present invention is particularly designed and configured for securement within a groove or circumferential slot formed by removal of at least one of the ribs adjacent the end of the pipe where the annular ring is being provided. After the rib is removed, the slotted end of the pipe is heated and a portion of the annular sealing ring is inserted in the slot. Thereafter, at least one of the inner or outer walls of the pipe, which has been softened, is caused to bend under applied pressure within a die so as to entrap and compress that portion of the annular sealing ring at the end of the pipe and thereby seal the end of the pipe so that liquid is unable to penetrate the end of the pipe and enter or exit the ribbed, helical channel of the pipe.

The remaining portion of the sealing ring axially projects beyond that end of the pipe. The annular sealing ring is formed of a resilient material that has two functions. Firstly, it serves to seal the rigid pipe end. Secondly, the projecting portion of the resilient sealing ring will also protect the pipe ends from impact when the pipes are subjected to handling. In this manner, the sealing ring of the present invention acts as a bumper for absorbing impact as well as a seal to prevent passage of fluids reaching the ends of the interstices of the inner and outer pipe walls.

A further embodiment of the present invention involves using dye and/or pigment materials to impart a bright color, for example, to the projecting portion of the sealing ring to enhance appearance of the pipe and/or provide visual information concerning the nature of the pipe.

According to another embodiment of the present invention, the sealing ring may be omitted. In this embodiment at least one of the ribs adjacent the end of the pipe is removed as previously mentioned, and at least one of the inner or outer walls of the pipe is heated and caused to bend under pressure within a die, but without insertion of the sealing ring in the slot. Instead, the softened wall is bent until at least a portion of the inner and outer walls are in contact at the end of the pipe, thereby at least partially sealing the end of the pipe. Since this normally does not result in complete sealing of the pipe end and leaves a small gap, a thin weld of plastic is applied to the pipe end to close the gap.

DESCRIPTION OF THE PREFERRED EMBODIMENT

Figure 1:
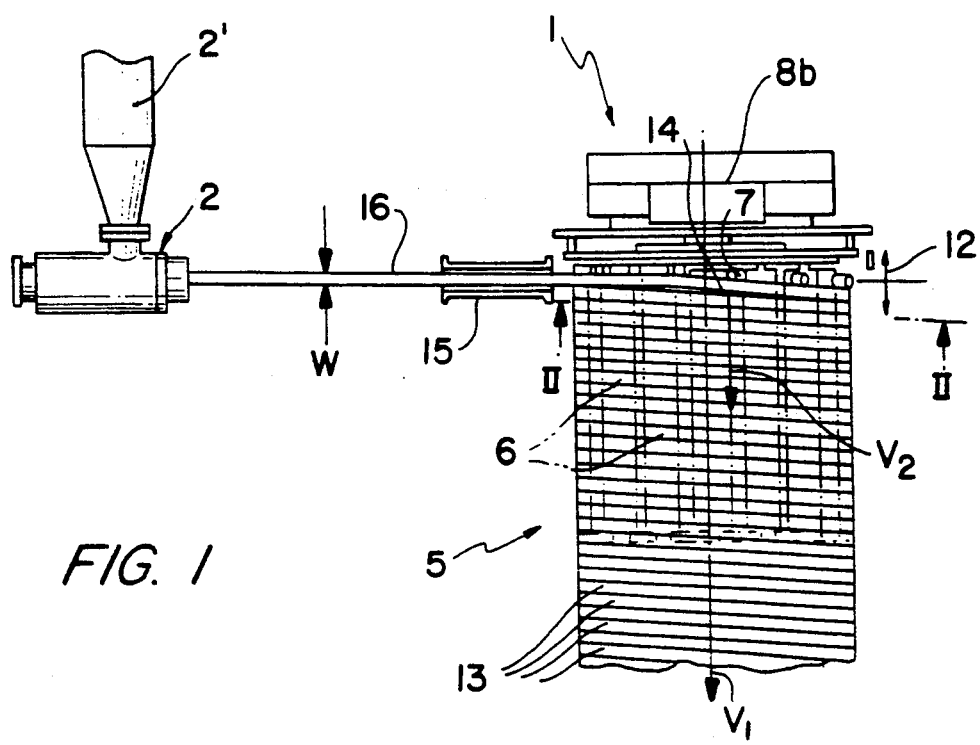
FIG. 1 is a plan view, partly in diagrammatic form of an apparatus for producing pipe of the present invention.

Although specific terms are used in the following description for the sake of clarity, these terms are intended to refer only to the particular structure of the invention selected for illustration in the drawings and are not intended to define or limit the scope of the invention.

Referring now to the drawings, there is shown in FIG. 1 apparatus designed to produce a large diameter pipe having a cylindrical configuration and composed of a thermoplastic synthetic resinous material such as polyvinyl chloride or other thermoplastic material commonly used in the formation of extruded pipe. This apparatus and method are described in detail in U.S. Pat. Nos. 3,917,500 and 4,033,808, which patents are hereby incorporated by reference.

The apparatus comprises a tube-coil machine 1, a synthetic resin extrusion press 2 and a guide or feed arrangement for directing an extruded synthetic resin hollow profile from the extrusion press to the coiling machine in which the continuously extruded strand or strip is helically coiled and the turns are butt welded to form the large diameter sewer pipe.

Figure 2:
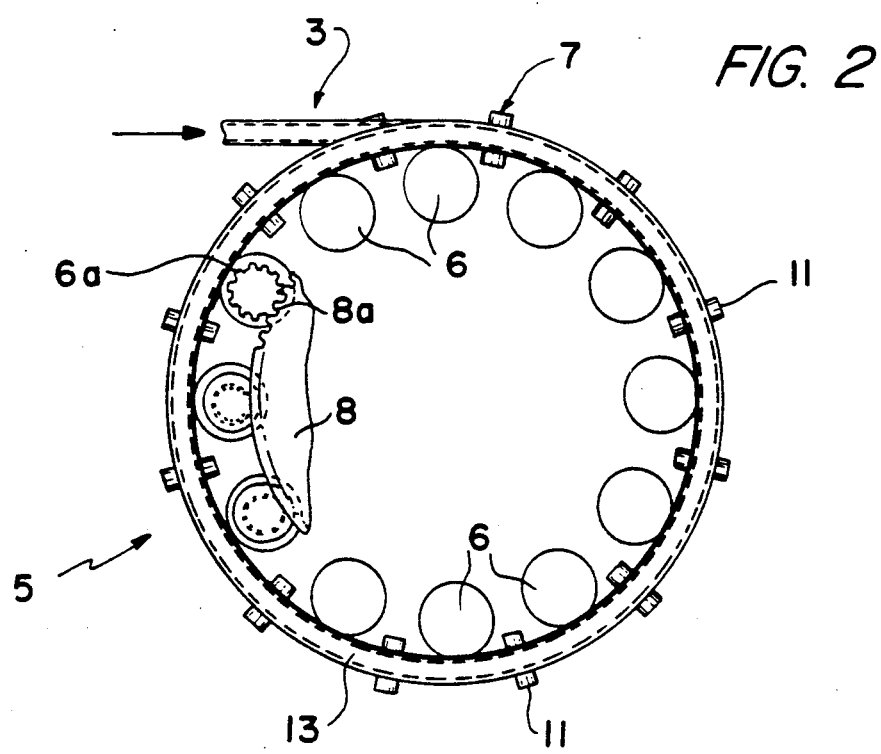
FIG. 2 is a cross-sectional view taken along the line II—II of FIG. 1 but drawn to a larger scale.

The coiling machine 1 comprises, as can be seen most clearly from FIG. 2, a coiling core provided in the form of a plurality of angularly equispaced circumferentially disposed rollers 6 which are synchronously driven. To this end each of the rollers 6 has a pinion 6a meshing with a common sun wheel 8a of a synchronous drive 8. Consequently, all of the rollers 6 are driven in the clockwise sense as the gear 8a is driven in the counterclockwise sense by a motor 8b (FIG. 1). The turns of the hollow profile strip 3 are thus caused to rotate in the clockwise sense as the pipe advances axially.

The finished pipe is forced axially off the assembly of rollers 6. The hollow profile 3 has an axial width w measured parallel to the axis of the pipe 5 and the vector $v_1$ and is fed to a point of contact 14 with the previously formed turn. Vector $v_2$ is a function of the pitch of the helix and the width w. Vector $v_2$ is greater than the vector $v_1$, the difference being represented by an axial compression of each incoming turn of the helix against the previously deposited turn. The axial pressure applied by radially extending rollers 7 is seen in FIGS. 1 and 2.

In FIG. 1 the coil rollers 6 are shown in dot-dash lines and can be seen to be parallel to the axis of the coiling machine although it is also possible to have them inclined slightly towards the axis of the machine in the direction of vanes of the pipe. The rollers 6 at their turn-deposition ends are formed with smooth steel peripheries 9 with a low coefficient of sliding friction, while at their pipe-discharge ends they are formed with braking sheaths 10 of rubber or another material having a high coefficient of friction. Thus just as the pipe tends to move off the array of rollers 6 a retarding force is frictionally induced between the rollers 6 of the completed coil or pipe 5.

Coiling rollers 6 are adjustable so that the peripheral speed of the rollers may be varied to control the rate at which the synthetic resin hollow profile strip is deposited on the coiling drum. This may be accomplished by providing a number of interchangeable rollers of different diameter but with identical pinion gears so that, for a given rotational speed of the pinion, the peripheral speed will be increased or decreased in accordance with the diameter of the coiling roller 6.

When the axial-pressure rolls 11 of the compaction device 7 are fixed in the axial direction, an increased peripheral speed will increase the value of the parameter $v_2$ and thereby increase the difference $(v_2-v_1)$ and hence the compaction force which is proportional to this difference. Alternatively, or in addition, the compaction rollers 11 of the axial pressure arrangement 7 can be adjusted in the direction of arrow 12 (FIG. 1) on a support not shown so that, for a given peripheral speed of the coiling rollers 6, the decrease to which the strip is compressed as it is laid against the previously formed turn of the helix can be increased. This, for course, corresponds to an increase in the value of the parameter $v_2$.

The axial-pressure rollers 11 can be replaced by pressure fingers so long as the incoming strip at thermal-welded temperature meets the previously formed turn of the helical-seam pipe and is applied with lateral and axial force sufficient to affect the bonding. As the strip is applied to the previously formed turn, it increases the length of the pipe at a rate dv/dt where v is the unit increase of the pipe length and t is the unit time. Consequently, if the strip has originally a width in the axial direction of w prior to the application to the pipe and the resulting turn has a width $w_1$ thereafter, the difference $(w-w_1)$ will be the measure to which the strip is compacted over each turn and the value $dv/dt = w_1/T$ where T is the time required to form a complete turn of the helix. Consequently, $v_2 = w/T$ and $(v_2 - v_1) = (w - w_1)/T$.

The lateral faces of the strip as it emerges from the extruder retain sufficient heat to effect bonding by the axial pressure corresponding to the compaction of the strip without collapsing the inner passage of the hollow profile strip 3 since the latter is supported by a liquid cushion (not shown). Cooling of the inner walls of the passage stiffens it and forms a tubular spring therefrom so that any force transmission across the passage is effected by the resilient deflection of this cold or congealed wall portion.

Figure 3:
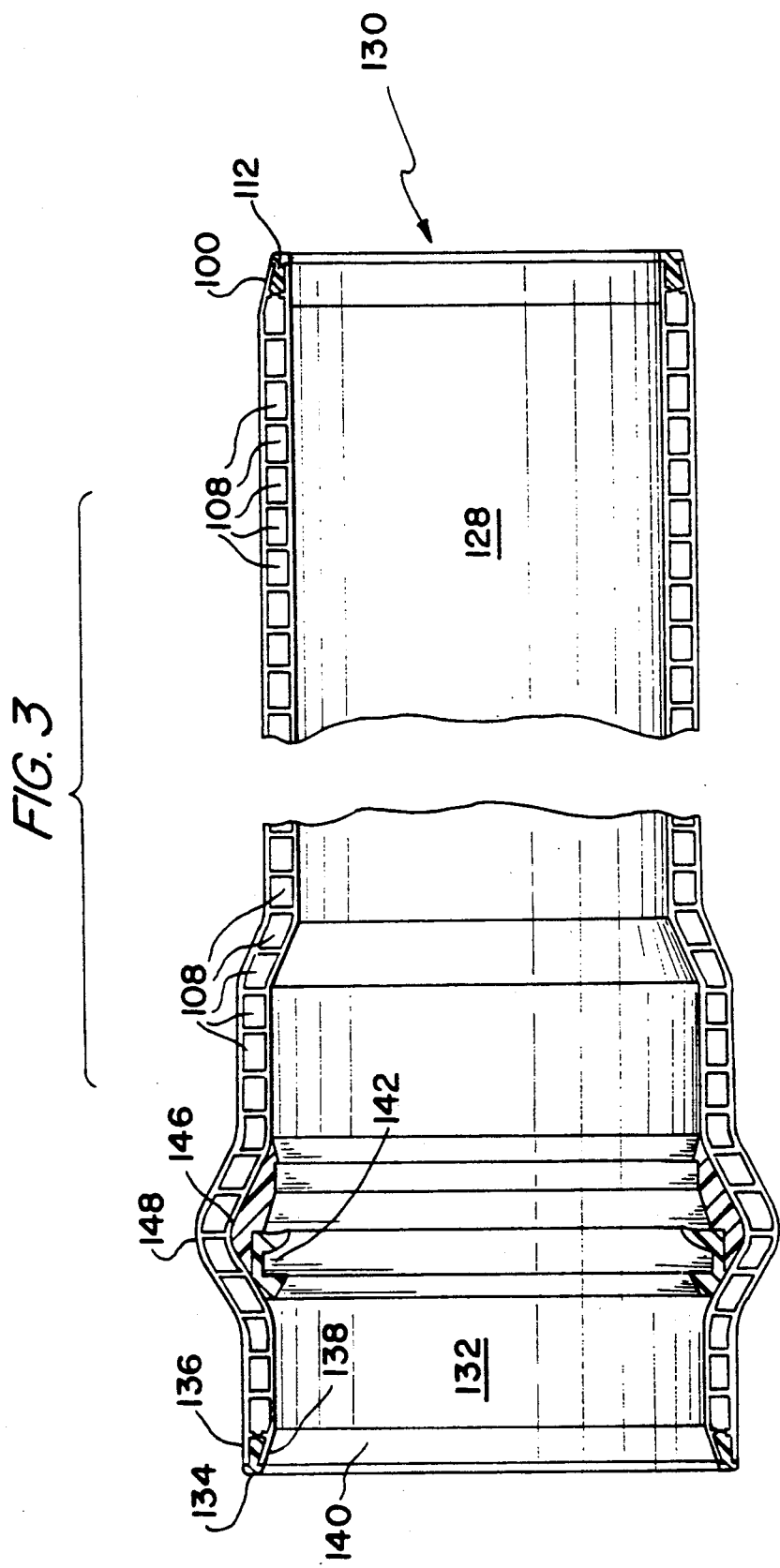
FIG. 3 is an enlarged, partial, cross-sectional view showing the socket and spigot ends of a length of pipe of the present invention.

FIG. 3 of the drawings shows, in general, a cross-sectional view of pipe of the type formed by the apparatus of FIG. 1, but having one end expanded or belled to form a socket and both ends modified in accordance with the present invention.

Figure 4:
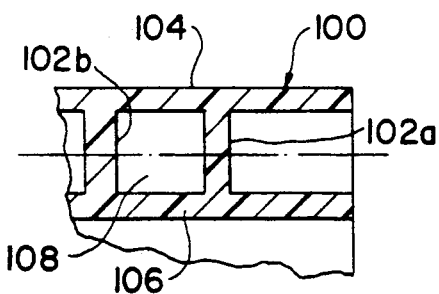
FIG. 4 is an enlarged, cross-sectional, fragmentary view of an end profile of the pipe formed in FIG. 1.

FIG. 4 shows the end 100 of a plastic pipe having ribs 102a and 102b which, together with outer wall 104 and inner wall 106, form channel openings 108. Channel openings 108 run helically about the periphery of the pipe interconnecting one end of the pipe with the opposite end.

Figure 5:
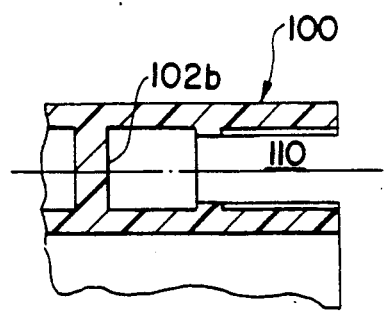
FIG. 5 is a view of the profile of FIG. 4 with an end rib portion removed.
Figure 6:
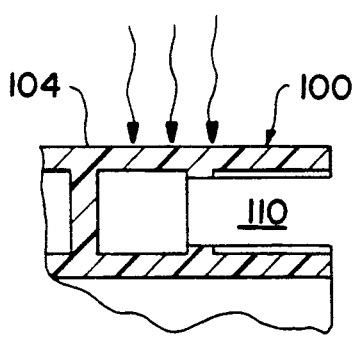
FIG. 6 is the end profile view of FIG. 5 being subjected to a softening temperature.

In accordance with the present invention, an axial end portion of rib 102a is removed as shown in FIG. 5 by any suitable means, such as by the use of a router to form circumferential slot 110 in pipe end 100. Next, heat is applied to pipe end 100 as shown in FIG. 6 to soften outer wall 104. Any suitable conventional heating means may be used to soften the outer wall 104 of the pipe after rib 102a has been removed. Suitable heating means include conventional heating means, such as standard resistance heaters and infrared heaters, but other suitable heating means may be employed. Infrared heaters are preferred.

Next, the annular sealing ring 112 of the present invention is inserted in circumferential slot 110, while outer wall 104 is still soft.

Figure 7:
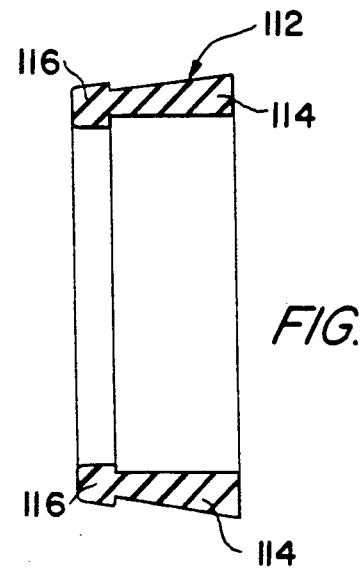
FIG. 7 is a cross-section through an annular impact resisting sealing ring of the present invention.

FIG. 7 shows annular sealing ring 112 for a spigot pipe end in cross-section having a generally sealing portion 114 and a generally cylindrical impact absorbing or bumper portion 116. Sealing portion 114 of spigot end sealing ring has a cylindrical inner surface and a frustoconical outer surface tapering toward bumper portion 116. In contrast, the sealing portion of belled end sealing ring 134 has a cylindrical outer surface and a frustoconical inner surface tapering toward the bumper portion (FIG. 2). The bumper portion extends radially inwardly and outwardly from the adjacent axial end of the sealing portion.

Sealing ring 112 may be formed of any resilient material which will serve both as a seal for pipe end 100 and as a bumper for providing impact resistance to the ends of the pipe when inserted. Preferably, sealing ring 112 is formed of an elastomeric material of the type commonly used in gaskets for sealing joints in the ends of plastic pipe.

However, according to another embodiment of the present invention, the sealing ring may be molded from two different materials such that sealing portion 114 is more resilient than the impact absorbing bumper portion 116. Sealing portion 114 must be sufficiently soft and resilient to act as a seal to prevent passage of liquids. Impact absorbing portion 116 serves only to provide impact resistance to the end of the pipe, and thus, need not be as resilient as portion 114, but more impact absorptive. Thus, different elastomeric materials may be molded together such that bumper portion 116 is formed of a different elastomeric material than is sealing portion 114. Additionally, as illustrated, sealing portion 114 can comprise a major portion of the sealing ring, since it must provide sufficient surface area to be entrapped by pipe end 100, while impact absorbing portion 116 may comprise a relatively minor portion of sealing ring 112 as it extends beyond the end of the pipe to provide impact resistance.

Figure 8:
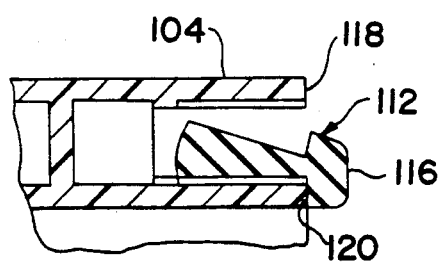
FIG. 8 is a cross-section showing insertion of the sealing ring of FIG. 7 in the heated profile of FIG. 6.

Referring to FIG. 8, sealing portion 114 of sealing ring 112 is inserted in slot 110, while outer wall 104 is still soft, such that bumper portion 116 extends axially beyond the terminus 118 of pipe end 100. The axial inward end 120 of bumper portion 116 can be configured having a radial, annular wall adapted to conform to and abut terminus portions or axial end surfaces 118 of walls 104 and 106 when in place. Alternatively, sealing ring 112 can be formed of sufficiently resilient elastomeric material such that a complementary configuration is not required.

Figure 9:
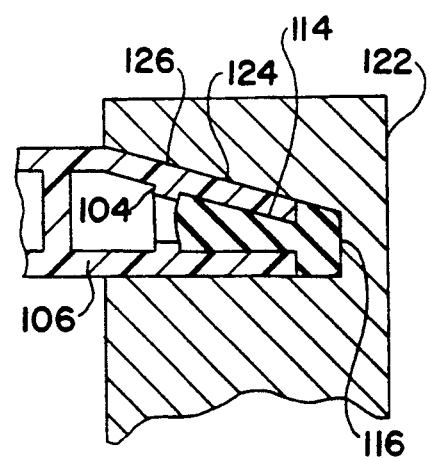
FIG. 9 shows the entrapped sealing ring of the present invention in a spigot end of the pipe.

Referring to FIG. 9, steel die 122 having a conically tapering wall 124 is slid over pipe end 100 while outer wall 104 is still soft from being heated causing outer wall 104 move inwardly and to form a converging configuration with inner wall 106, thereby entrapping and compressing sealing portion 114 of sealing ring 112 between the inner wall 106 and outer wall 104. Bumper portion 116 is positioned such that it extends beyond terminus portions 118 of the pipe end. When pipe end 100 is removed from steel die 122, end 100 can serve as a spigot end of the pipe having improved impact resistance both during handling and as well as a chamfered edge 126 for easy insertion into the socket end of an adjacent section of pipe.

Bumper portion 116 may contain a dye or pigment, so as to have, for example, a red or yellow color such that exposed bumper portion of sealing ring 112 is visible and possesses an enhanced appearance. Additionally, color coding of the gasket end bumper not only enhances appearance, but can be used to visually identify special pipe properties like material composition, level of stiffness, dimensions and end use. For example, pipe of the present invention can be produced in different thicknesses for different load purposes. Thus, pipe to be buried beneath a highway road will need to have a greater thickness to prevent being crushed, while pipe to be installed adjacent the highway need not be as thick. Thus, by color coding the end bumper of the thicker pipe with a red color and thinner pipe with blue gasket end bumpers, installers in the field can quickly visually recognize a thinner pipe section and not mistakenly install it under highway road along with thicker sections. This voids the need for field personnel to carry instruments for measuring pipe thickness and for actually measuring thickness before installation to avoid such mistake.

As seen in FIG. 3, annular sealing ring 112 is circularly seated into pipe end 100 of spigot portion 128 of pipe 130 to prevent liquid which may have entered channels 108 from external water streams from entering the socket portion of an adjacent length of pipe through pipe end 100.

Also shown in FIG. 3 is socket section 132 which is provided with entrapped sealing ring 134 which may be identical in composition and similar structure to sealing ring 112 or may be formed of a different elastomeric material. Sealing ring 134 has been entrapped between outer wall 136 and inner wall 138 using the same procedure as described previously in connection with FIGS. 4-9, with the exception that inner wall 138 has been heated and caused to diverge to form a beveled socket 140 for ease of insertion of the spigot end of an adjacent length of pipe. In this manner, impact resistance is also provided to socket end 140, so that pipe 130 has been provided with impact resistance to both ends of a single length of pipe as well as enhanced appearance, if desired. Socket section 132 of pipe 130 is provided with a double lip gasket 142 circularly seated in gasket holding ring 144 which, in turn, is circularly seated in annular gasket groove 146 provided in large bell or hub 148.

Accordingly, when the spigot section of a second length of pipe is inserted in socket section 132 of pipe 130, the beveled socket permits easy entrance of the spigot and of such pipe which then contacts gasket 142 to provide a tight, sealed joint.

Figure 10:
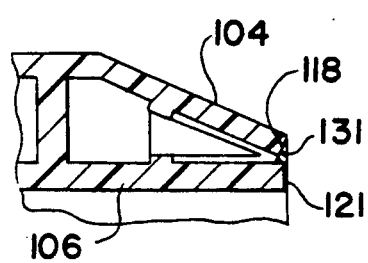
FIG. 10 shows a further embodiment of the present invention in a spigot end of the pipe.

FIG. 10 shows another embodiment of the present invention in which the sealing ring is omitted. Thus, sealing of the pipe end shown in FIG. 10 is provided by removal of an axial end portion of rib 102a of FIG. 4 as illustrated and described in connection with FIG. 5, and by heating pipe end 100 as described and illustrated in connection with FIG. 6. However, instead of inserting sealing ring 112 into the heated pipe end, as shown in FIG. 8, a steel die similar to steel die 122 shown in FIG. 9 is slid over pipe end 100 absent sealing ring 112 while outer wall 104 is still soft from being heated, causing outer wall 104 to move inwardly until end 118 is in at least in partial contact with end 121 of inner wall 106 as shown in FIG. 10.

Since a small gap normally exists along the circumference of the pipe end between pipe ends 118 and 121, plastic welding material 131 is applied by any suitable means, preferably in the form of a thin rod of plastic, such as poly(vinyl chloride), having a thickness of 1/16-1/8 inch. The thin rod is melted or fused to the pipe to seal the gap using any suitable means, such as a conventional welding gun, to completely seal pipe end 100 after pipe end 100 has cooled. A preferred welding gun is a heat gun having a nozzle from which a thin stream of hot air issues and contacts the plastic rod and fuses the rod to the pipe to seal the gap as shown by material 131 in FIG. 10. This welded embodiment of the present invention constitutes an improvement over prior sealing methods such as those employing epoxy plastic putty over filed spigot ends, but does not have the impact and other described advantages of the sealing ring embodiment of the present invention.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A plastic pipe extending along a longitudinal axis, comprising:
   a cylindrical body having two ends and two longitudinally extending, concentric walls spaced from the longitudinal axis of the pipe comprising an inner wall and an outer wall;
   said walls being connected by rib means extending generally radially between said walls and longitudinally of the pipe and terminating adjacent to but spaced from one of said ends of said pipe, said walls and rib means at said one end defining at least one longitudinal slot opening on said one end;
   a generally annular, resilient, axially extending sealing ring secured in said slot, said sealing ring having a first portion and a second portion, said first portion of said sealing ring being entrapped in said slot by end portions of said inner and outer walls so as to seal said slot at said one end of said pipe;
   said second portion of said resilient sealing ring axially projecting beyond said one end of said pipe to provide impact resistance to said one end of said pipe;
   said sealing ring being composed of an elastomeric material.

2. The pipe of claim 1, wherein said first portion of said sealing ring comprises a major portion of said ring and second portion of said sealing ring comprises a minor portion of said ring.

3. The pipe of claim 1, wherein the other of said ends of said pipe has walls and rib means defining at least one longitudinal second slot opening on said second end; said second end being provided with an axially extending second sealing ring secured in said second slot, said second sealing ring having a first portion and a second portion, said first portion of said second sealing ring being entrapped in said second slot by end portions of said inner and outer walls so as to seal said slot at said second end of said pipe, and a second portion of said second sealing ring axially projecting beyond said second end of said pipe to provide impact resistance to said second end of said pipe.

4. The pipe of claim 1, wherein said inner concentric wall is located closely adjacent said outer concentric wall.

5. The pipe of claim 1, wherein said second portion of said sealing ring is provided with a dye or pigment such that said second portion of said sealing ring has a color different from said pipe.

6. The pipe of claim 1, wherein said slot has a constricted opening.

7. The pipe of claim 1, wherein said pipe is formed of rigid plastic.

8. The pipe of claim 7, wherein said pipe is formed of rigid polyvinyl chloride.

9. A generally rigid plastic pipe or tubular body comprising:
   a cylindrical body having two ends and two longitudinally extending, concentric walls adjacent the periphery of the pipe comprising an inner wall and an outer wall;
   said walls being connected by a plurality of ribs having helicoidal axes extending along the longitudinal axis of the pipe, and together with the inner and outer walls forming at least one generally rectangular helically extending channel along the periphery of the pipe and terminating adjacent one end of said pipe;

said one end of said pipe terminating in a generally annular, elastomeric, axially extending sealing ring, said sealing ring having a major portion and a minor portion, said major portion of said sealing ring being entrapped by the end portions of said inner and outer walls so as to seal said helically extending channel at said one end of said pipe;

and said minor portion of said elastomeric sealing ring axially projecting beyond said one end of said pipe to provide impact resistance to said one end of said pipe.

10. The pipe of claim 9, wherein one of said end portions of one of said walls is inclined toward the other of said walls.

11. The pipe of claim 9, wherein said first portion of said ring has a cylindrical annular surface and a frustoconical annular surface, said surfaces extending axially and being entrapped by said end portions of said walls.

12. A plastic pipe extending along a longitudinal axis, comprising:
- a cylindrical body having two ends and two longitudinally extending, concentric walls spaced from the longitudinal axis of the pipe comprising an inner wall and an outer wall;
- said walls being connected by helical rib means extending generally radially between said walls and longitudinally of the pipe and terminating adjacent to but spaced from one said end of said pipe, one of said walls adjacent said one end being inclined toward the other of said walls said walls and rib means defining at least one longitudinal slot opening on said one end;
- a generally annular, axially extending weld means of different material at least partially secured in said slot between end portions of said inner and outer walls so as to seal said slot at said one end of said pipe.

13. A plastic pipe extending along a longitudinal axis, comprising:
- a cylindrical body having two ends and two longitudinally extending, concentric walls spaced from the longitudinal axis of the pipe comprising an inner wall and an outer wall;
- said walls being connected by rib means extending generally radially between said walls and longitudinally of the pipe and terminating adjacent to but spaced from one of said ends of said pipe, said walls and rib means at said one end defining at least one longitudinal slot opening on said one end;
- a generally annular, resilient, axially extending sealing ring secured in said slot, said sealing ring having a first portion and a second portion, said first portion of said sealing ring being entrapped in said slot by end portions of said inner and outer walls so as to seal said slot at said one end of said pipe;
- said second portion of said resilient sealing ring axially projecting beyond said one end of said pipe to provide impact resistance to said one end of said pipe;
- one of said end portions of one of said walls being inclined toward the other of said walls.

14. A plastic pipe extending along a longitudinal axis, comprising:
- a cylindrical body having two ends and two longitudinally extending, concentric walls spaced from the longitudinal axis of the pipe comprising an inner wall and an outer wall;
- said walls being connected by rib means extending generally radially between said walls and longitudinally of the pipe and terminating adjacent to but spaced from one of said ends of said pipe, said walls and rib means at said one end defining at least one longitudinal slot opening on said one end;
- a generally annular, resilient, axially extending sealing ring secured in said slot, said sealing ring having a first portion and a second portion, said first portion of said sealing ring being entrapped in said slot by end portions of said inner and outer walls so as to seal said slot at said one end of said pipe;
- said second portion of said resilient sealing ring axially projecting beyond said one end of said pipe to provide impact resistance to said one end of said pipe;
- said first portion of said sealing ring being entrapped by a converging outer wall at said one end of said pipe to form a chamfer.

15. A plastic pipe extending along a longitudinal axis, comprising:
- a cylindrical body having two ends and two longitudinally extending, concentric walls spaced from the longitudinal axis of the pipe comprising an inner wall and an outer wall;
- said walls being connected by rib means extending generally radially between said walls and longitudinally of the pipe and terminating adjacent to but spaced from one of said ends of said pipe, said walls and rib means at said one end defining at least one longitudinal slot opening on said one end;
- a generally annular, resilient, axially extending sealing ring secured in said slot, said sealing ring having a first portion and a second portion, said first portion of said sealing ring being entrapped in said slot by end portions of said inner and outer walls so as to seal said slot at said one end of said pipe;
- said second portion of said resilient sealing ring axially projecting beyond said one end of said pipe to provide impact resistance to said one end of said pipe;
- said first portion of said sealing ring being entrapped by a diverging inner wall at said one end of said pipe.

16. A plastic pipe extending along a longitudinal axis, comprising:
- a cylindrical body having two ends and two longitudinally extending concentric walls spaced from the longitudinal axis of the pipe comprising an inner wall and an outer wall;
- said walls being connected by rib means extending generally radially between said walls and longitudinally of the pipe and terminating adjacent to but spaced from one of said ends of said pipe, said walls and rib means at said one end defining at least one longitudinal slot opening on said one end;
- a generally annular, resilient, axially extending sealing ring secured in said slot, said sealing ring having a first portion and a second portion, said first portion of said sealing ring being entrapped in said slot by end portions of said inner and outer walls so as to seal said slot at said one end of said pipe;
- said second portion of said resilient sealing ring axially projecting beyond said one end of said pipe to provide impact resistance to said one end of said pipe;
- said first portion of said ring having a cylindrical annular surface and a frustoconical annular surface, said surfaces extending axially and being entrapped by said end portions of said walls.

* * * * *